Figure 1:
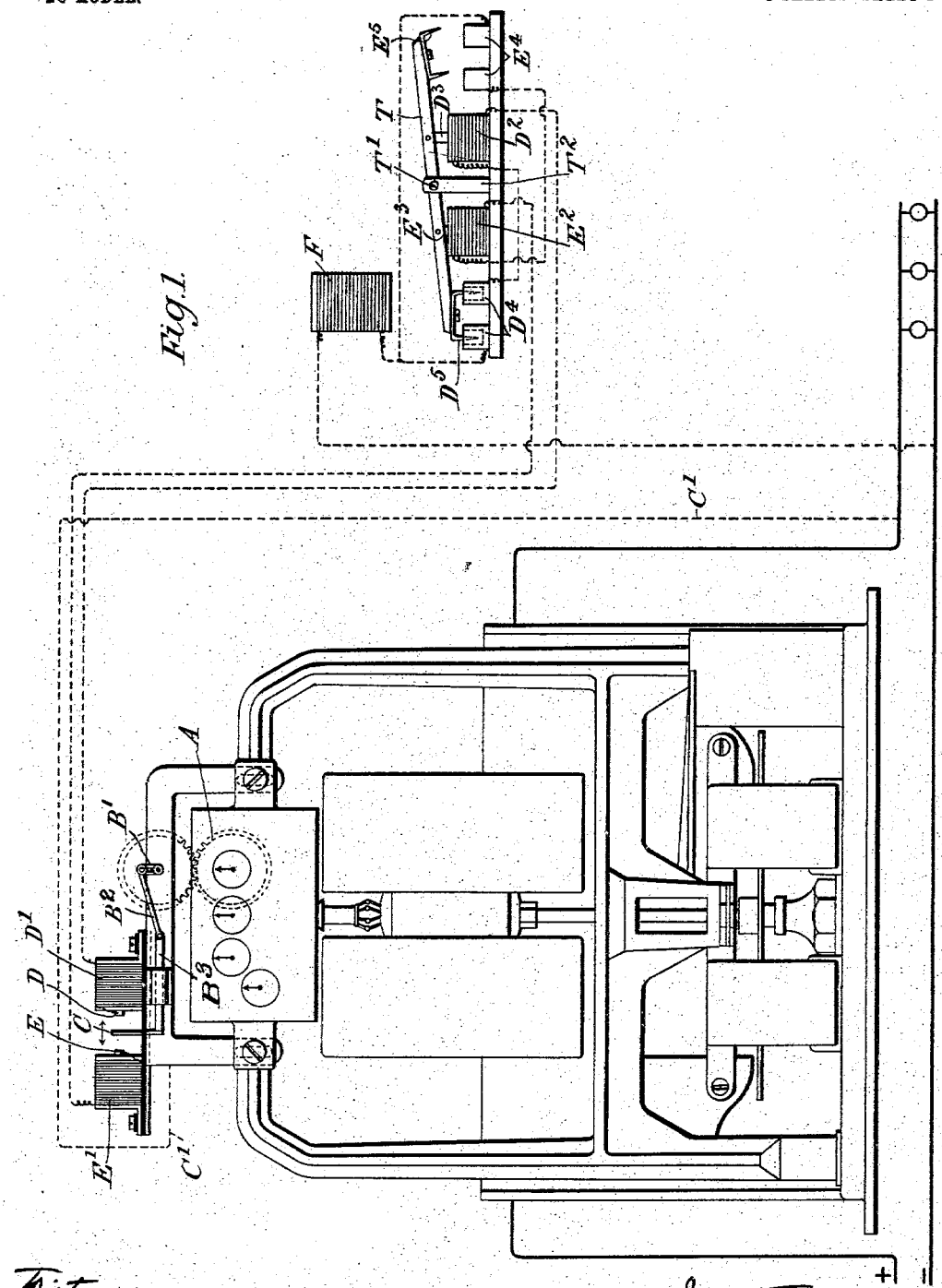

No. 740,216. PATENTED SEPT. 29, 1903.
C. O. BASTIAN.
PREPAYMENT ATTACHMENT FOR ELECTRICITY METERS.
APPLICATION FILED FEB. 19, 1902.
NO MODEL. 5 SHEETS—SHEET 1.

No. 740,216. PATENTED SEPT. 29, 1903.
C. O. BASTIAN.
PREPAYMENT ATTACHMENT FOR ELECTRICITY METERS.
APPLICATION FILED FEB. 19, 1902.
NO MODEL. 5 SHEETS—SHEET 2.

No. 740,216. PATENTED SEPT. 29, 1903.
C. O. BASTIAN.
PREPAYMENT ATTACHMENT FOR ELECTRICITY METERS.
APPLICATION FILED FEB. 19, 1902.
NO MODEL. 5 SHEETS—SHEET 4.

No. 740,216. PATENTED SEPT. 29, 1903.
C. O. BASTIAN.
PREPAYMENT ATTACHMENT FOR ELECTRICITY METERS.
APPLICATION FILED FEB. 19, 1902.
NO MODEL. 5 SHEETS—SHEET 5.

No. 740,216. Patented September 29, 1903.

UNITED STATES PATENT OFFICE.

CHARLES O. BASTIAN, OF LONDON, ENGLAND.

PREPAYMENT ATTACHMENT FOR ELECTRICITY-METERS.

SPECIFICATION forming part of Letters Patent No. 740,216, dated September 29, 1903.

Application filed February 19, 1902. Serial No. 94,823. (No model.)

*To all whom it may concern:*

Be it known that I, CHARLES ORME BASTIAN, electrical engineer, a subject of the King of Great Britain, residing at 37 Streatley road, Brondesbury, London, England, have invented a Prepayment Attachment for Electricity-Meters, of which the following is a specification.

This invention relates to electricity-meters, and has for its object to provide a prepayment attachment for such meters whereby on insertion of a suitable coin or token a predetermined amount of current can then pass through the meter and when the quantum of electricity or electric energy paid for has passed through the meter thereupon the prepayment attachment will automatically cut off further supply until the insertion of a further coin or token of proper value, and so on, this prepayment attachment comprising, in combination with an electricity-meter of any suitable character, more especially a pair of contacts oppositely disposed to one another and between which is located a moving contact-piece capable of being moved by the progress of the meter into electrical connection alternately with one or the other of the two first-named contacts, a solenoid with a movable core adapted when energized to discharge or release one or more disks or weights from a reservoir containing such disks or weights, a pivoted beam located below said reservoir, a receptacle carried on said beam toward one end thereof and adapted to receive therein said disks or weights as and when the latter are released or discharged from said reservoir, a coin-receptacle carried on said beam toward the other end thereof and adapted to receive and hold therein the coins or tokens to be inserted through a slot, main-circuit contacts adapted to be closed when the end of the beam carrying the coin-receptacle is caused to descend on insertion of the proper coin or token through the slot and adapted to be broken again when the other end of said beam is depressed on a weight or disk being discharged into the receptacle thereon from the aforesaid reservoir, and also my present invention comprises other details and improvements, all of which will be fully described hereinafter and finally pointed out in the claims.

Figure 2:
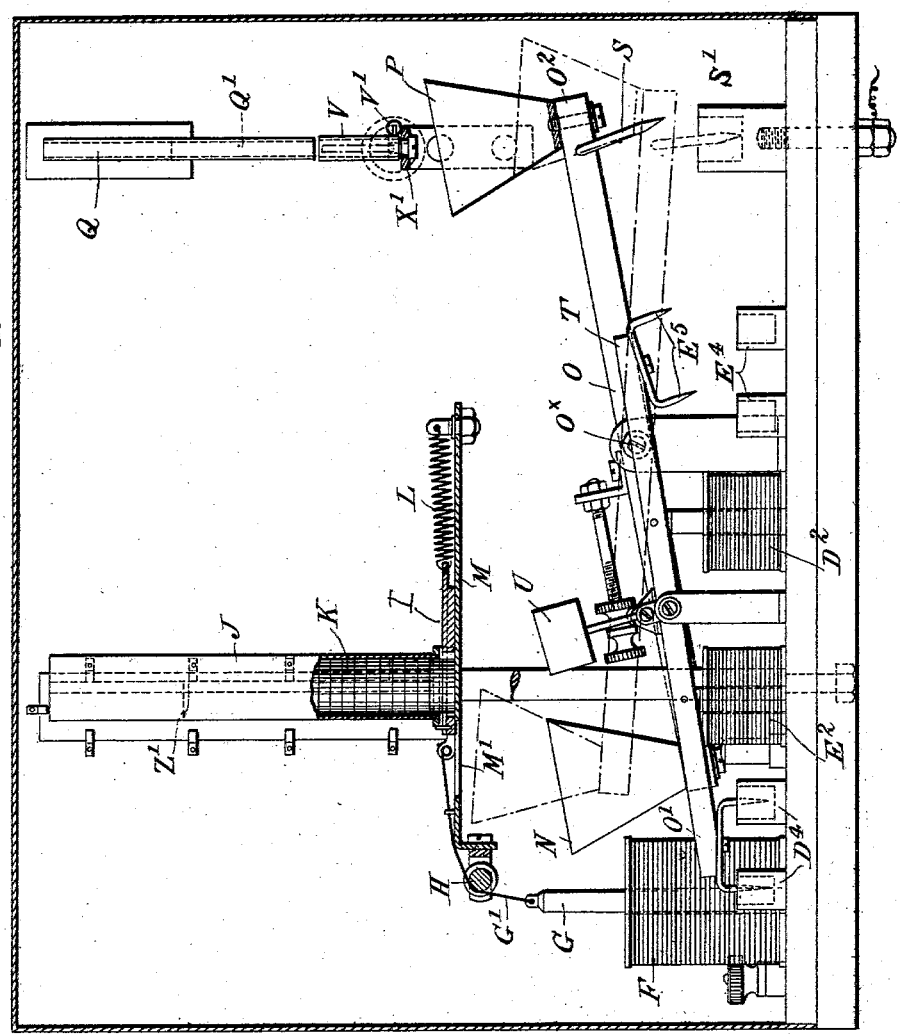
Figure 3:
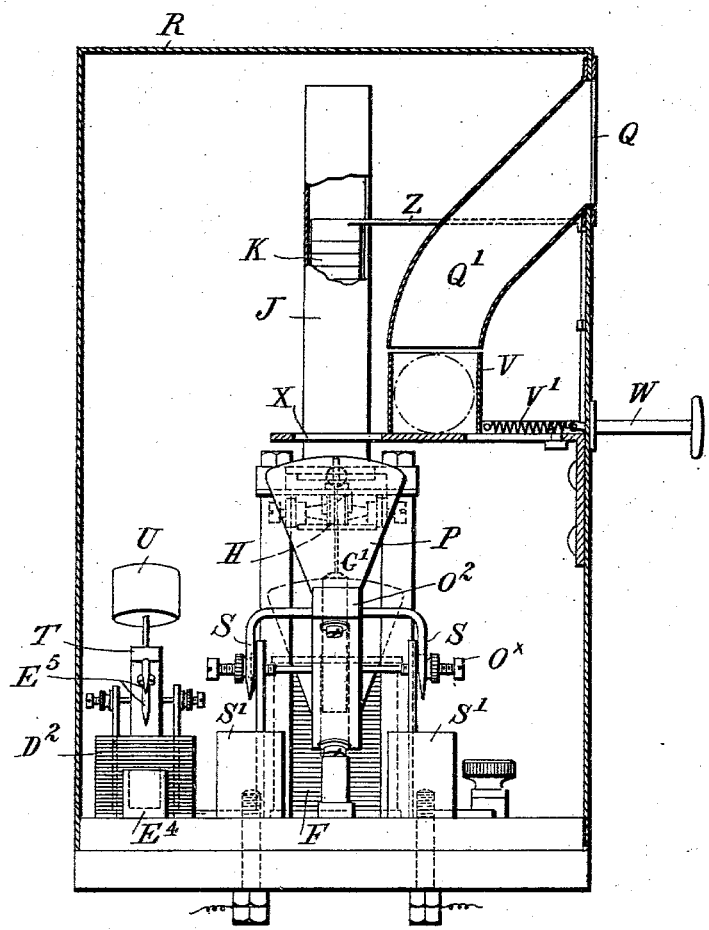
Figure 4:
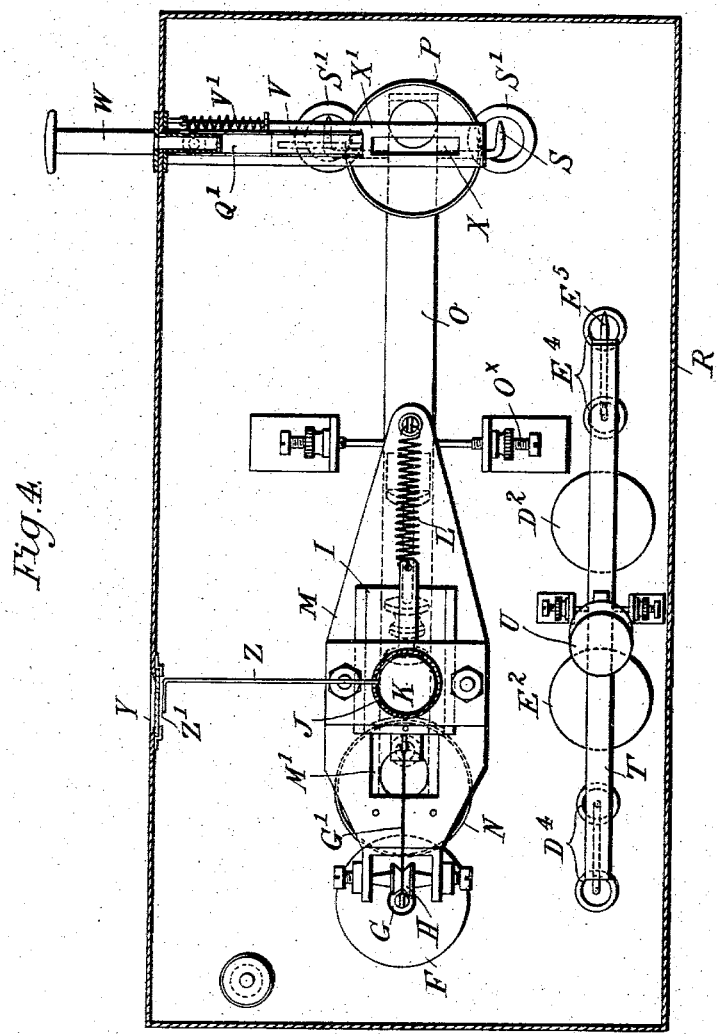
Figure 5:
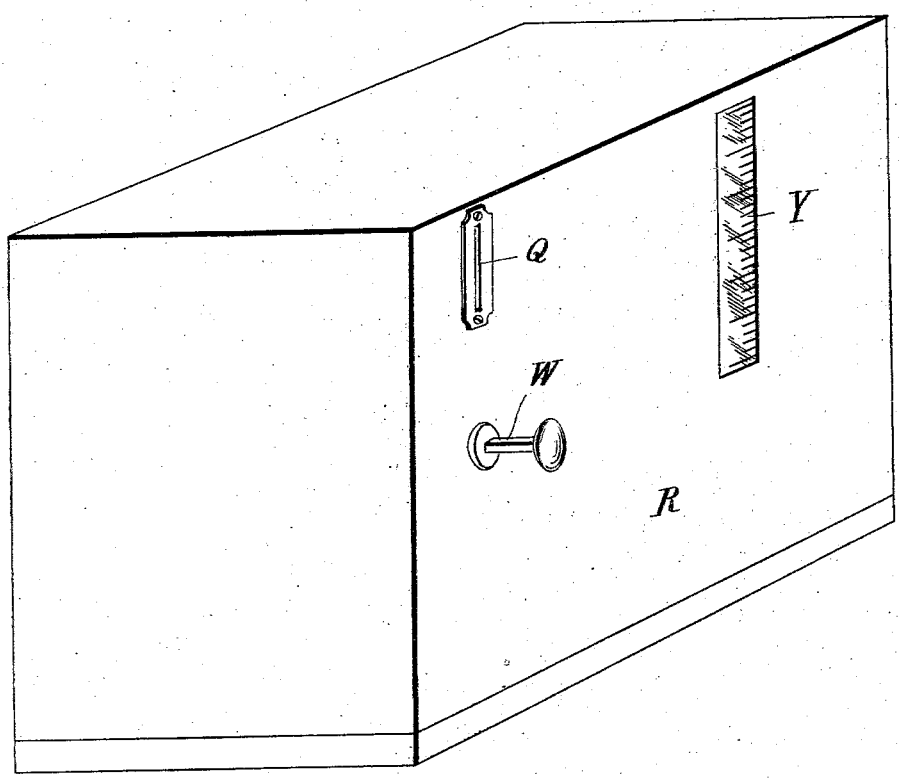

Referring to the drawings hereunto annexed, Figure 1 is a general view in side elevation of my present invention carried out in conjunction with an electricity-meter of the well-known "motor" type. Fig. 2 is a side elevation, on an enlarged scale, of part of the prepayment attachment according to the present invention. Fig. 3 is an end view of Fig. 2. Fig. 4 is a plan of Fig. 2. Fig. 5 is an exterior view of the case containing the coin-freed mechanism.

Similar letters of reference indicate corresponding parts throughout.

A is a gear-wheel fixed to one of the meter index-wheels or train of wheels of a meter of the well-known motor type, which need not, therefore, be further described herein, such meters being well known and in common use. B is a toothed wheel in gear with said toothed wheel A, such gear-wheel B having a crank B' thereon, with connecting-rod B², which operates the slide B³, which latter carries the movable contact C thereon, whereby said movable contact C is adapted to be reciprocated between the contacts D and E, these contacts C, D, and E, respectively, being arranged in such wise and in such connection with the winding of the solenoid F that upon the arm C making contact either with D or E thereupon such solenoid F will be energized and thereupon the movable core G is drawn into the solenoid F, and by means of the flexible connection G' (attached to the core G and to the slide I) passing over the pulley H thereby the spring-retracted slide I is drawn across the bottom of the reservoir J, containing the weights or disks K, and immediately the current is broken in the coil F, and thereby the core G released, the spring L will return the slide I to its normal position. The aforesaid slide I is adapted when thus operated by the core G and solenoid F to move the bottom one (or more) of the weights K (in the reservoir J) along the table M until said weight or disk is brought over the aperture M' in said table, whereupon such weight or disk K will drop through said aperture M' into the receptacle N therefor, carried toward one end O' of the beam O, pivoted at $O^x$, the other end $O^2$ of said beam carrying a receptacle P, adapted to receive and hold therein a certain number of coins or tokens inserted through the slot Q (and chute Q') in the case R.

S S is a bridge-piece for closing the main circuit by means of the mercury-cups S' S', into which the ends of said bridge-piece S S are inserted when the end $O^2$ of the beam O is depressed, as shown in dotted lines in Fig. 2. Thus when the coin or token is dropped into the receptacle P, and consequently the end $O^2$ depressed into the position shown in dotted lines in Fig. 2, thereby the main current can flow until the progress of the meter has moved the arm C against either the contact D or contact E, whereupon the solenoid F is energized, the core G and slide I thereby operated, and one (or more) weight or disk K is removed from the reservoir J and dropped through the aperture M' into the receptacle N, whereupon the end O' will overbalance the end $O^2$ and the beam O will be rocked into the position shown in full lines in Fig. 2, and thereupon the main circuit will be broken suddenly.

For the purpose of breaking the shunt-circuit through the solenoid F and for the purpose of preventing or reducing to a minimum any sparking (either at making or at breaking contact) between the arm C and contact D or between the arm C and contact E, I may proceed as follows: The contact-piece D, made of any suitable material, (say soft iron,) is provided with a winding D', and the contact E is provided with a corresponding winding E', the winding D' being in electrical connection with a solenoid $D^2$ and the winding E' in electrical connection with a solenoid $E^2$, located on opposite sides of the point where a rock-beam T is pivoted at T' in a support $T^2$, this beam T carrying cores $D^3$ $E^3$, controlled by the solenoids $D^2$ and $E^2$, respectively. From the solenoid $D^2$ the shunt-circuit leads through the mercury-cups $D^4$ via the bridge-piece $D^5$ (carried toward one end of the rock-beam T) of the solenoid F and thence back to the main circuit, while the shunt-circuit through the solenoid $E^2$ leads through the mercury-cups $E^4$ via the bridge-piece $E^5$, also through the solenoid F back to the main circuit. Thus it will be seen that with the parts in the position shown in Fig. 1 when the aforesaid arm C has by the progress of the meter been moved into contact with the contact-piece D thereby the shunt-circuit through the winding D' and solenoid $D^2$ will be closed, and the solenoid F energized simultaneously, and thereby the slide I operated as aforesaid, and at the same time the energizing of the solenoid $D^2$, acting on the core $D^3$, will pull down its end of the beam T, and thereby lift the bridge-piece $D^5$ out of the mercury-cups $D^4$ and break this shunt-circuit at this point, and consequently break the circuit through the solenoid F, and at the same time will also place the ends of the bridge-piece $E^5$ in the mercury-cups $E^4$ and complete the junction of the second circuit at this point, but such second shunt-circuit at this moment being broken between the arm C and contact E, and upon the further progress of the meter moving the arm C into electrical connection with the contact E, immediately this takes place the second shunt-circuit will be closed and the current flow through the winding E', solenoid $E^2$, mercury-cups $E^4$, via the bridge-piece $E^5$ to the solenoid F, and thence back to the main circuit, and simultaneously with the energizing of the solenoid $E^2$ same will act on its core $E^3$ and pull down its end of the beam T, thus lifting the bridge-piece $E^5$ out of the mercury-cups $E^4$ and breaking the second shunt-circuit at this point, and consequently breaking the circuit through the solenoid F, and at the same time will place the bridge-piece $D^5$ again in the mercury-cups $D^4$ and complete the junction at this point in the first shunt-circuit, which latter, however, is at this time broken between the contact D and the arm C until the latter is again moved back into electrical connection with said contact D, when the first-described operation is repeated, and so on.

C' is the electrical connection between the arm C and the main circuit.

U is a jockey-weight pivoted on the beam T above the center T', said weight U being capable of a very limited movement only in either direction in suchwise as to overbalance and weigh down whichever end of the beam T is depressed, so as to render the action of said beam "dead-beat." By this arrangement, therefore, there will be no sparking take place between the movable arm C and the contact D, either on making or breaking the circuit, and similarly there will be no sparking between the movable arm C and the contact E either in making or breaking circuit therethrough. Furthermore, by this arrangement I provide that in the event of two or more coins being placed in advance in the receptacle P the end $O^2$ of the beam O is thereby depressed until the corresponding number (or corresponding weight) in disks or weights K has been removed from the reservoir J into the receptacle N to overbalance said supply of coins or tokens. Consequently the action of the meter can proceed, and the movable arm C can be moved into contact alternately with the contacts D and E until the sufficient number of weights or disks K have (by the operation of the slide I) been transferred into the receptacle N, whereupon the beam O will at last be rocked and the main circuit thereby broken, as aforesaid.

Any suitable means may be employed for the purpose of preventing the insertion of any instrument, wire, &c., through the slot Q and chute Q' to operate the beam T and to prevent tampering with the prepayment attachment through the slot Q in any such manner. For instance, I may form the chute Q', as shown in Fig. 3—namely, the lower end of the chute Q' may lead the coin into a movable pocket or receptacle V, adapted to be held in position under said chute Q' by means of a spring V' and also adapted to be moved by means of the push-rod W from under the chute Q', over the aperture X in the horizontal support X', whereupon the coin can drop through the bottom of said pocket V, through the aperture X, into the receptacle P, and on releasing the rod W the spring V' will return said rod and the pocket V attached thereto to their normal position, as shown in Fig. 3.

The movable arm C may either be a spring-arm or may be so arranged and mounted as to have a small amount of play in either direction, so that acting in conjunction with the electromagnets D D' and E E' alternately as said arm approaches each contact D and E in turn and as soon as said arm C makes the slightest contact with either of them—say with the contact-piece D—thereupon the winding D' is energized, thereby magnetizing the contact-piece D. Consequently the arm C is instantly drawn firmly against said contact D, and similarly in the case of the contact-piece E when the movable arm C approaches the latter, while, on the other hand, by reason of the circuit thus closed in each case being immediately broken again at the point $D^4$ or $E^4$, as the case may be, consequently all tendency to spark is prevented as the movable arm C recedes from said contact-piece D or E.

The receptacle P should be of such a size as to hold less coins or tokens than the corresponding weights or disks in the reservoir J, so that when the receptacle P is full then on insertion of any further coin or token same will not depress the beam O, or, if desired, any suitable means may be provided for automatically closing the coin-slot Q, and thus prevent the entrance of coins into the coin-chute until the column K has been refilled, such means for preventing further insertion of coins in coin-freed mechanism being well known. Therefore I have not thought it necessary to illustrate same in the drawings hereunto annexed. In this connection and for the purpose of indicating to any one from the exterior of the case the progress of the meter not only may the meter-index be visible from the exterior of the case, as usual, but I may provide a window Y (with a scale) in the case R, and to the top weight K I attach a wire Z, carrying a pointer Z', which will thereby be moved over said scale on the window Y as the column of weights K decrease to thus indicate how many more coins may be inserted.

Although I have described and illustrated my invention more particularly as carried into practice in connection with a well-known type of meter, I wish it to be clearly understood that I do not confine myself to this particular form of meter, as obviously my invention may be carried into practice in conjunction with any electricity-meter to which my invention may be applicable, it being obvious that my said invention is particularly adapted to the well-known Thomson-Houston meters, Edison meters, Arun meters, Westinghouse meters, electrolytic meters, &c.

Having now described my invention, what I claim as new, and desire to secure by Letters Patent of the United States, is—

1. In combination with an electrical meter, of a prepayment attachment comprising two local circuits, means controlled by the meter for closing said circuits alternately, circuit-closing mechanism for the main circuit, and means operated through said local circuits for automatically opening said main circuit through said circuit-closing mechanism.

2. In combination with an electrical meter, of a prepayment attachment comprising two local circuits, means controlled by the meter for closing said circuits alternately, coin-controlled circuit-closing mechanism for the main circuit, and means operated through said local circuits for automatically opening said main circuit through said circuit-closing mechanism.

3. In combination with an electrical meter, of a prepayment attachment, comprising two local circuits, means controlled by the meter for automatically closing said local circuits alternately, local-circuit-breaking mechanism connected with said local circuits and controlled by said local-circuit-closing mechanism, circuit-closing mechanism for the main circuit, and means connected in said local circuits for opening said main circuit.

4. In combination with an electrical meter, of a prepayment attachment, comprising two local circuits, means controlled by the meter for automatically closing said local circuits alternately, local-circuit-breaking mechanism connected with said local circuits and controlled by said local-circuit-closing mechanism, circuit-closing mechanism for the main circuit, and electrically-operated means, controlled through said local-circuit-breaking mechanism.

5. In combination with an electrical meter, of a prepayment attachment comprising two local circuits, means controlled by the meter for automatically closing said local circuits alternately, local-circuit-breaking mechanism connected in said local circuits and controlled by said local-circuit-closing mechanism, circuit-closing mechanism for the main circuit, means for operating said main-circuit-closing mechanism to close said main circuit, and means electrically operated by said local circuits for breaking said main circuit.

6. In combination with an electrical meter, of a prepayment attachment comprising two local circuits, means controlled by the meter for automatically closing said local circuits alternately, local-circuit-breaking mechanism connected in said local circuits and controlled by said local-circuit-closing mechanism, circuit-closing mechanism for the main circuit, coin-controlled means for operating said main-circuit-closing mechanism to close said main circuit, and means electrically operated by said local circuits for breaking said main circuit.

7. In combination with an electrical meter, of a prepayment attachment comprising two local circuits, means controlled by the meter for automatically closing said local circuits alternately, local-circuit-breaking mechanism connected in said local circuits and controlled by said local-circuit-closing mechanism, circuit-closing mechanism for the main circuit, means for operating said main-circuit-closing mechanism to close said main circuit, and electrically-operated means, connected in circuit with said local-circuit-breaking mechanism, to automatically control the breaking of said main circuit.

8. In prepayment attachments for electricity-meters, the combination of two local circuits each having a fixed contact-piece therein oppositely disposed to one another, a movable contact-arm adapted to be moved by the progress of the meter into electrical connection with first one and then the other of said contacts to thereby alternately close said two local circuits respectively, a solenoid common to each said local circuit, an independent solenoid in each separate local circuit and means operated thereby to break each local circuit immediately it is closed, means operated by the first-named solenoid to discharge a weight or disk from a reservoir, a receptacle adapted to receive said weights or disks and carried on a rock-beam, a receptacle located on the other end of said rock-beam and adapted to receive the coins or tokens therein, and contacts in the main circuit operated by said rock-beam, substantially as and for the purposes hereinbefore described.

In witness whereof I have hereunto set my hand in presence of two witnesses.

CHAS. O. BASTIAN.

Witnesses:
A. NUTTING,
H. D. JAMESON.